METHOD OF MAKING PLANOGRAPHIC PRINTING PLATES
Filed July 18, 1950
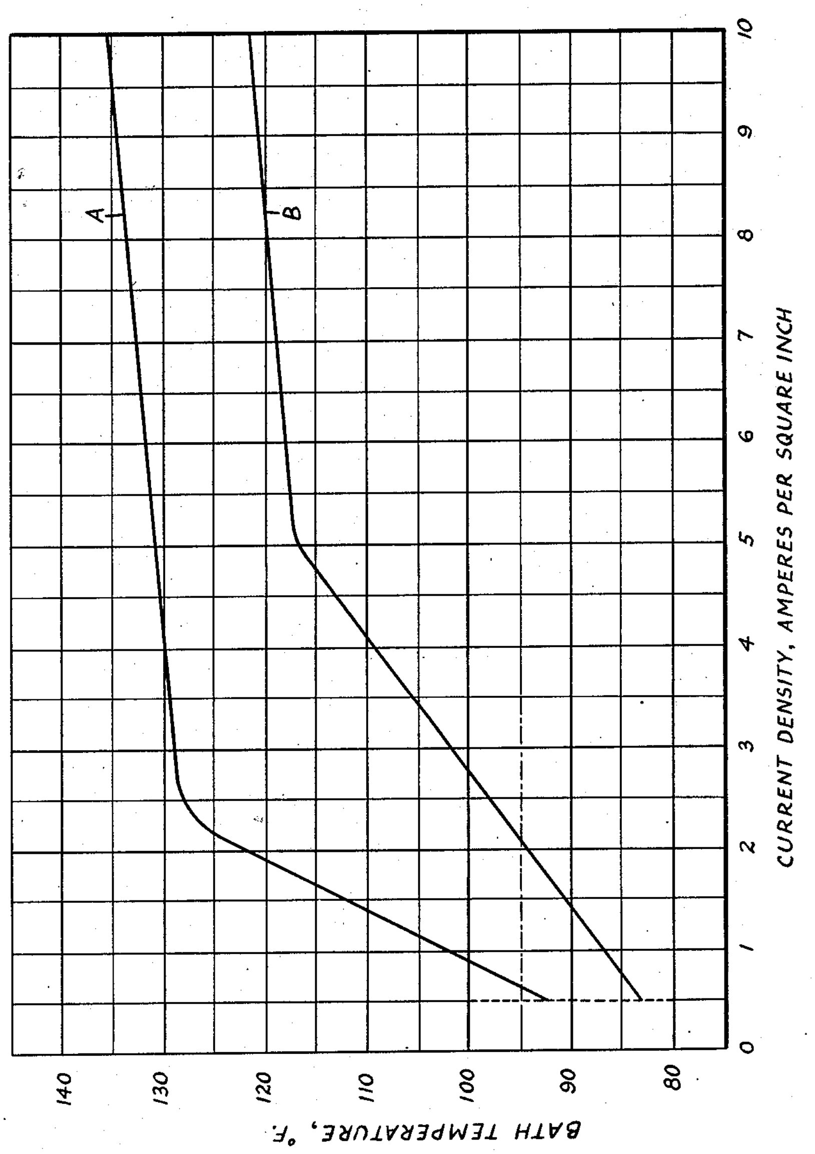
INVENTORS.
CHARLES FREDERICK GEESE
DONALD BRUCE LYTLE
BY
Campbell, Brumbaugh, Free & Graves
THEIR ATTORNEYS.

Patented May 11, 1954 2,678,299

UNITED STATES PATENT OFFICE 2,678,299

METHOD OF MAKING PLANOGRAPHIC PRINTING PLATES

Charles Frederick Geese, Old Greenwich, Conn., and Donald Bruce Lytle, Bronxville, N. Y., assignors, by mesne assignments, to Printing Developments, Inc., New York, N. Y., a corporation of New York Application July 18, 1950, Serial No. 174,532

11 Claims. (Cl. 204—17)

This invention relates to improvements in methods of preparing and conditioning the printing surfaces of planographic printing plates for lithographic and offset printing.

This is a continuation-in-part of our application Serial No. 701,084, filed October 4, 1946.

In the development of the lithographic printing art, the lithographer's stone has largely been replaced by metallic printing plates because of the ability of such metallic plates to be placed on cylinders used in high speed printing presses. In the conventional preparation of such printing plates, a chemically clean base plate is usually covered with a thin coating of egg albumin and bichromate of ammonia or like material and is thereupon exposed to light through a photographic negative. At the places exposed to light, the coating becomes hardened whereas, at the places that are not exposed, due to the opaqueness of the negative, the coating remains in a state that allows it to be readily removed from the plate, as by washing, with the result that a positive image is retained on the plate in the form of a hardened coating usually referred to as a resist image. The bare surfaces of the plate are receptive to water and resistant to grease or ink whereas the resist image is resistant to water and receptive to grease or ink. The plate is thereupon placed on a printing roller and alternately brought into contact with wetting and inking rollers with the result that the resist image absorbs and is made capable of printing ink whereas the exposed metal surface does not take up ink and therefore will not print on the paper fed between the printing roller and a pressure roller.

Inasmuch as albumin and bichromate of ammonia coatings and the like can withstand only a limited amount of abrasion and mechanical wear, many efforts have been made in the past to prepare printing plates having superior wearing properties. These efforts led to the development of bi- and tri-metallic printing plates. It has been proposed, for example, to deposit a coating of copper upon a plate of stainless steel, superimpose a resist coating on the copper coating, expose the coated plate to light through a negative to produce a resist image, wash off the unhardened resist, dissolve away the copper exposed by the selective removal of the resist, and finally remove the resist image with the result that a copper image remains on the stainless steel plate. In plates of this type, the stainless steel surface is rendered grease or ink resistant and receptive to water, whereas the copper coating that remains in the form of the image to be reproduced becomes receptive to grease or ink and non-receptive to water.

Another proposal has been to deposit a coating of copper upon a grained steel plate, deposit a coating of chromium on top of the copper coating, super-impose a resist coating on the chromium coating, expose the coated plate to light through a positive to selectively harden the resist, wash off the unhardened resist, dissolve away the chromium exposed by the selective removal of the resist, and finally remove the remaining resist image with the result that the finished plate has a base of steel, a coating of grained copper at the places corresponding to the dark portions of the image, and a coating of grained chromium at the places corresponding to the light portions of the image. In trimetallic plates of this type, the chromium surfaces are ink or grease-resistant whereas the exposed copper surfaces are water-resistant and receptive to ink or grease.

Neither of these proposals has met with complete success for the reason that the dissolution and removal of the copper or chromium coatings, especially with grained copper, is accompanied by a loss of dot that makes it impossible to reproduce fine lines or even bold lines without a great deal of fuzziness in the final print.

The more conventional plates, which utilize hardened albumins or the like as the ink transfer surfaces, have the disadvantage of being useful for printing runs of relatively short duration only, and of being damaged when the hardened resist is removed. When it is desired to replace a worn resist on this type of plate with a new, identical resist image to produce another run of the same image, the image must be exposed on a plate newly coated with a resist in exact register with the first image. Efforts to place different resist images on previously used plates have hitherto resulted in inferior reproductions.

One object of the present invention is to provide planographic plates for lithographic printing operations that do not possess the disadvantages of the conventional plates or of the previously proposed modifications thereof discussed above.

Another object of the invention is to provide a method of applying a water-receptive chromium layer to a base plate and further treating the plate to expose through the chromium layer an ink-receptive image-printing surface of metal other than chromium.

An additional object of the invention is to provide a bimetallic planographic printing plate having ink-receptive and water-receptive surfaces delineating the printing and non-printing areas which are capable of reproducing faithfully subject matter made with fine line half tone screens or in which broad areas of solid tones may be reproduced with a minimum of control.

These and other objects will become apparent from the following description of typical methods embodying the present invention.

The single figure of the drawing illustrates the current density and temperature ranges suitable for electrodeposition of chromium in the process.

In accordance with the present invention, a method of preparing a planographic printing plate is provided wherein a base plate of any suitable metal such as, for example, copper, brass, steel, zinc or the like, is coated by electrolytic means with a coating of chromium, no parts of which need be removed during the entire life of the plate.

A long run lithographic plate is prepared by rendering chemically clean a plate of copper, having for example, a smooth, ungrained or polished surface. In cleaning the plate, it may be rubbed with pumice and a chemical cleaner so that the surface may be somewhat dull. Nevertheless, the surface is smooth and free from grain, as this term is understood in the art. A resist is applied to the chemically clean surface of the plate in any desired manner as, for example, by use of the conventional whirler. Any of the well-known resists such as cold top enamel, hot top enamel, gilsonite, asphaltum or egg albumin may be used. The resist is then dried, the coated plate is removed from the whirler or other coating device, and placed in a vacuum frame wherein it is exposed in the conventional manner to a source of light through a screened transparent photographic image. Because of the smooth surface of the plate, a very sharp screened image is produced in the resist. After this printing operation, the plate is washed out under water so that only the printed image in the form of the hardened resist, that is, the resist image, is left on the plate. This much of the procedure is conventional in the art.

The resist image is then baked on the plate where necessary to secure the image and the plate is thereupon placed in a suitable rack. After the plate, bearing the baked resist image, has been placed in the rack, it is thoroughly cleaned in any suitable manner, as, for example, with a 15% solution of glacial acetic acid and common table salt to remove any and all traces of copper oxide and any other undesirable material and to expose the bare copper surface at those parts not covered by the resist. If desired, the exposed copper surface may then be etched to a depth of about .0002 inch by well-known means with dilute phosphoric acid, dilute nitric acid, or dilute ferriferrous chloride, or the like. By way of example, such etching may be carried out with a four minute application of a cotton swab soaked with ferriferrous chloride solution of 44° Bé. diluted to 25% by volume and maintained at a temperature of 55° to 60° F.

In such an etching operation, the smooth surface permits a very sharp image to be etched because the etching liquid does not tend to flow under the resist along the spaces between the grains as in a grained plate, or to act irregularly due to the irregular surface area produced by granularity in the plate surface.

The plate is then thoroughly rinsed in clean water and placed, without permitting the plate to dry, in an electrolytic bath where chromium is deposited on the exposed copper areas of the plate.

The method of plating with chromium on the base plate is of extreme importance if satisfactory results are to be obtained. Thus, in lithographic work where broad areas are printed, it is highly desirable that the chromium should be of such nature that it will hold the water tenaciously and thereby prevent the non-printing areas from taking up ink and producing unclear or blotchy copies or producing water streaks. Likewise, when dealing with screened images, and especially when using screens containing a great many lines per inch, for example, a 300 to 500 line screen, the surface of the copper must be smooth in order to permit sharp copying of the screened image, and at the same time, the chromium areas must be highly water-retentive so that they will repel ink and thus permit sharply defined dots to be reproduced on the web by the printing plate. This is especially so in the darker tones where the chrome areas are very small and relatively widely spaced. Unless the chrome dots retain the water strongly, they will be covered with ink and the screen formation will be lost with a resulting loss of contrast in the middle and deep tones of the printed subject matter.

The preferred and most satisfactory method of plating the chromium is as follows.

The electrolytic bath may consist of an aqueous solution containing about thirty-four ounces of chromium trioxide and about .34 ounce of commercial sulfuric acid (66° Bé.) per gallon of water. The concentration of the solution is, of course, susceptible to considerable variation.

The temperature of the bath and the plate is maintained at between 105° and 108° F., and chromium is deposited on the plate for a period of from 2½ to 4 minutes at a current density of 1.5 amperes per square inch and at a potential of from 4.0 to 6.5 volts, preferably 6.0 to 6.5 volts. In the course of this plating operation, the current is interrupted, for example, by reducing the current flowing through the bus bars to zero potential, for about 15 to 60 seconds after the first 1½ to 3 minutes, the plating then being continued for one additional minute. This plating operation deposits on the plate a dull gray layer of chromium having a thickness of the order of .0002 of an inch.

The current interruption is of great importance in the production of the desired type of plate. The plating conditions (time, temperature and current density) are such that, in the absence of a current interruption, a bright chromium plate would be deposited on the printing plate. Such a bright plate has inadequate water receptivity for lithographing printing operations or for printing substantially solid tones, except under ideal conditions, which are seldom realized.

After the plating operation, the plate is removed from the plating tank and carefully rinsed in clean water and dried. The dry plate is then dipped into hot trisodium phosphate solution, a hot lye solution, or sodium cyanide solution to remove the resist originally applied. The plate is then very carefully rinsed with clean water and treated to remove any film left from the plating operation or the resist removing operation with such chemicals as dilute phosphoric acid, alcohol, sodium hexametaphosphate, boric acid, a higher sodium alkyl sulfate having detergent properties, lactic acid, or the like. These chemicals may be used individually or in combinations of two or more to obtain the desired results. This treatment renders the image, that is, the exposed copper portions of the plate, grease receptive and resistant to water and the chromium plated areas highly and uniformly receptive to water. The plate is then ready to be placed on the press in the conventional manner.

A long run plate of this type is capable of running off upwards of two to three million impressions without showing signs of appreciable wear and will reproduce photographic images of the most detailed kind. Tests have shown that it is capable of reproducing clear and sharp images made with screen containing up to 500 lines per inch. Furthermore, after a day's printing operation, it is unnecessary to apply a protective coating of gum arabic or the like to prevent oxidation. When printing operations are resumed, the plate need simply be washed off with gasoline to make it ready for reuse.

The above-described preferred example of the plating operation is highly effective, and, as indicated above, assures excellent results in the preparation of printing plates of the type described. However, it is possible to obtain equivalent results throughout a substantial range of temperatures and current densities as disclosed generally in the single figure of the drawing in which the necessary plating conditions (temperature and current density) for producing a highly water-retentive chrome plate are within the area enclosed by the lines A and B. Generally speaking, plating conditions within the area defined by the lines A and B of the graph, including the interruption of current during the plating operation, produce chromium deposits which are characterized by a dull surface of a uniform and fine grain.

The plating conditions within the area in the plating zone above the line A, even with a current interruption, produce a bright chromium plate, which, as pointed out hereinafter, has not been found satisfactory for all plating conditions.

The plating conditions in the area below the line B produce nodular chromium deposits which are dull in nature but of an irregular, coarsely crystalline form which has irregular water-retentive characteristics, and is relatively highly abrasive so that it has a tendency to damage the belts, molletin rollers, or blankets of an offset printing press.

The plating conditions in the area enclosed with the lines A and B have been determined by comparative printing tests with a large number of printing plates plated under the conditions both within the area A—B and outside this area. Each of these plates was provided with subject matters of widely varying type including, on each plate, small reverse type on a solid black background; a three-step 200-line grey scale printed with a shadow tone next to a solid bar and a 300-line picture. All of the completed plates were then inked in precisely the same way and operated in the same printing press so that the printing operation was as uniform as it was possible to make it. It was found that all of the plates within and some of them outside of the area defined by the lines A and B made reasonably good or excellent prints under ideal printing conditions. These ideal printing conditions required precise control of the press speed, close regulation of the amount of water applied to the plates and a close control of the ink fed to the printing plates. However, these ideal printing conditions are seldom encountered in normal practice, and when the operation of the press departed from the ideal conditions, those plates made under conditions of temperature and current density outside the area defined by the lines A and B on the figure of the drawing failed to produce satisfactory prints. Thus, it was found in the case of all of the printing plates having bright chromium deposits that when a slight excess of water was applied to the plate, water streaks formed on the chrome surface and the quality of the print fell off very badly. Similarly, the nodular chromium plates were found to streak and to be less retentive of the water under normal but not ideal conditions so that unsatisfactory printing was obtained. Also, the picture areas of both the bright and the nodular chromium surface plates filled in with ink when the water was decreased below optimum value with the result that the tonal balance and contrast of the prints made therefrom were unsatisfactory.

On the other hand, the printing plates, having finely grained dull chromium water-retentive areas which are deposited under the conditions within the area defined by the lines A and B, are relatively insensitive to substantial changes in the volume of the water applied to the plates so that, under printing conditions far from ideal their action was entirely satisfactory.

The area defined by the lines A and B is not completely closed at the high current density end of the chart for it was found that increases in current density did not at any time cause the lines A and B defining the upper and lower limits to intersect, thereby indicating that higher current densities than 10 amperes per square inch might be used under some conditions. However, practical considerations, such as the impossibility of obtaining uniform current densities over the entire area of commercial sizes of printing plates, make it impractical to use current densities higher than 10 amperes and, under most circumstances, much above 5 amperes per square inch. Also, plating at temperatures less than 95° F. or current densities much less than ¾ ampere per square inch, results in a chrome deposit having relatively low abrasion or scratch resistance. The chromium deposited in this temperature range therefore is not very suitable for a long-run type of printing plate such as is disclosed herein. Therefore, as illustrated in the graph, when plating with an electrolytic bath of the type referred to above, a plate of the type which has a highly satisfactory water-receptive chromium layer may be obtained at a current density between about ¾ and 10 amperes per square inch within the range defined by the following limits:

| | | | |
|---|---|---|---|
| 95° F. to | 97.5° F. at | 0.75 | amp. per sq. in. |
| 95° F. to | 102.0° F. at | 1.0 | amp. per sq. in. |
| 95° F. to | 112.5° F. at | 1.5 | amp. per sq. in. |
| 95° F. to | 122.0° F. at | 2.0 | amp. per sq. in. |
| 102° F. to | 129.0° F. at | 3.0 | amp. per sq. in. |
| 109° F. to | 130.0° F. at | 4.0 | amp. per sq. in. |
| 117° F. to | 131.0° F. at | 5.0 | amp. per sq. in. |
| 118° F. to | 132.0° F. at | 6.0 | amp. per sq. in. |
| 119° F. to | 133.0° F. at | 7.0 | amp. per sq. in. |
| 120° F. to | 133.5° F. at | 8.0 | amp. per sq. in. |
| 121° F. to | 134.5° F. at | 9.0 | amp. per sq. in. |
| 122° F. to | 135.5° F. at | 10.0 | amp. per sq. in. |

In other words, any combination of current densities and temperatures falling within the area bounded by these temperature and density relations, that is, within the area bound by the lines A and B in the graph, will produce the chromium plate in accordance with the present invention, if the current is interrupted for a period of 15 seconds to 60 seconds after a preliminary buildup of the chrome deposit and plating is resumed for 20 to 90 seconds after the current interruption.

The interruption of the plating current during the plating operation has been found essential to the production of a satisfactory chromium deposit. Unless the current is interrupted for a short period of time before plating is completed, a bright chromium plate is produced. The current may be interrupted by opening the circuit to the cell, but preferably, it is done by reducing the current flow through the cell to zero current density, while maintaining a small potential across the cell. The disadvantages of such a bright plate have been pointed out above. The duration of this current interruption and the duration of plating following the current interruption has been found to be critical. Thus, except at high current densities, 5 amperes per square inch or higher, a secondary plating operation (after current interruption) of less than twenty seconds produces an inferior plate resulting in substantial loss in print quality. Also prolonged initial plating at low current densities, and prolonged plating after the current interruption results in an inferior product. In the circumstances, a current interruption of fifteen to sixty seconds duration followed by a secondary plating or continuation of the plating operation for a period of twenty to sixty seconds at moderate current density has been found to produce the most satisfactory print quality. The following table discloses typical plating operations which have resulted in highly satisfactory chromium deposits.

*Table I*

| Bath Temperatures, ° F. | Amps./Sq. inch | Initial Plating Time, Seconds | Lull Time, Seconds | Final Plating Time, Seconds |
|---|---|---|---|---|
| 105 | 1.0 | 180 | 60 | 45 |
| 105 | 1.5 | 120 | 60 | 30 |
| 105 | 1.75 | 103 | 60 | 26 |
| 105 | 2.0 | 90 | 60 | 22½ |
| 110 | 1.5 | 120 | 60 | 30 |
| 120 | 5.0 | 40 | 60 | 10 |
| 130 | 5.0 | 40 | 60 | 10 |

The criticality of the plating operation is indicated by the following table showing conditions under which unsatisfactory chromium deposits were made.

*Table II*

| Bath Temperatures, ° F. | Amps./Sq. inch | Initial Plating Time, Seconds | Lull Time, Seconds | Final Plating Time, Seconds |
|---|---|---|---|---|
| 90 | 1.0 | 180 | 60 | 45 |
| 90 | 2.5 | 72 | 60 | 20 |
| 105 | 1.5 | 60 | 60 | 90 |
| 130 | 1.5 | 120 | 60 | 30 |
| 130 | 2.0 | 90 | 60 | 22½ |
| 130 | 3.0 | 60 | 60 | 15 |
| 140 | 2.0 | 90 | 60 | 22½ |
| 140 | 3.0 | 60 | 60 | 15 |

Photomicrographic studies of the various plates confirm the fact that the character of the chromium deposit made within the critical plating range and with the proper plating technique as described above is of a different character than the plate outside the preferred plating range. The chromium plate within the preferred plating range has a uniform fine grain whereas the plate in the bright range has quite a different granularity or lack of granularity, and the plate produced in the nodular range is irregular with large and small irregular grain sizes which provide the roughness which is undesirable in such a printing plate.

While the preferred method described above deals with the preparation of printing plates in which the chromium plate is applied through a resist to the etched surface of a smooth, ungrained copper or copper-base metal plate, similar results can be obtained by depositing the fine grained chromium directly on a smooth copper or copper-base metal, or aluminum-base metal plate, or a steel plate carrying a layer of copper or copper-base metal, and thereafter applying a resist to the chromium layer, exposing the chromium layer to light through the subject matter to be reproduced in the form of a screened transparency and then etching through the chromium to expose the underlying copper-base metal surface which forms the ink-receptive portion of the plate. The areas of chromium remaining after the etching is completed and the resist has been removed, are water-receptive and ink-repellent and the exposed copper-base metal is ink or grease-receptive.

From the preceding description of the invention, it will be apparent that we have provided a method of applying chromium in the production of printing plates which produces a remarkably water-receptive and retentive surface and which, in conjunction with a smooth or polished copper ink-receptive portion enables the reproduction or printing of substantially all types of subject matter from that including broad masses of dark or solid tones to finely detailed subject matter having a long range of tones such as can be produced only with extremely fine line screens.

It will be understood that the process is susceptible to considerable modification so long as the plating conditions are maintained within the range specified. Moreover, the physical operations of the preparation of the printing plate from photographic or other subject matter are susceptible to a great deal of modification and substantially any halftone, gravure or lithographic method can be used in the preparation of planographic plates embodying the present invention. Therefore, the examples of methods embodying the present invention described herein should be considered as illustrative and not as limiting the scope of the following claims.

We claim:

1. A method of depositing a water-receptive chromium surface layer for a bimetallic planographic printing plate, comprising immersing a plate having a smooth, ungrained metal surface in a chromium plating bath containing chromium trioxide and sulfate ions in a ratio of about 100 to 1, passing electric current between an anode and the plate as a cathode, at a selected current density between about ¾ ampere and 10 amperes per square inch for a period of about 1 to 3 minutes, interrupting the current for a period of about 15 to 60 seconds, again passing the current between the anode and the plate for an additional period of 20 to 60 seconds, to deposit a layer of dull, fine-grained chromium on said ungrained surface, the temperature of the bath being maintained, at said selected current density per square inch, within the range defined by the following limits:

| | | | | | | | |
|---|---|---|---|---|---|---|---|
| 95° F. | to | 97.5° F. | at | 0.75 | ampere(s) |
| 95° F. | to | 102.0° F. | at | 1.0 | ampere(s) |
| 95° F. | to | 112.5° F. | at | 1.5 | ampere(s) |
| 95° F. | to | 122.0° F. | at | 2.0 | ampere(s) |
| 102° F. | to | 129.0° F. | at | 3.0 | ampere(s) |
| 109° F. | to | 130.0° F. | at | 4.0 | ampere(s) |
| 117° F. | to | 131.0° F. | at | 5.0 | ampere(s) |
| 118° F. | to | 132.0° F. | at | 6.0 | ampere(s) |
| 119° F. | to | 133.0° F. | at | 7.0 | ampere(s) |
| 120° F. | to | 133.5° F. | at | 8.0 | ampere(s) |
| 121° F. | to | 134.5° F. | at | 9.0 | ampere(s) |
| 122° F. | to | 135.5° F. | at | 10.0 | ampere(s) |

2. The method set forth in the preceding claim in which the ungrained metal surface consists of a copper-base metal.

3. In a method of making a planographic printing plate including the steps of applying a resist-forming material to a metal surface of a plate, exposing said resist-forming material to light rays in the form of the image to be reproduced, developing the resist-forming material to produce a resist having hardened areas resistant to penetration of an etching medium, and etching the metal surface of said plate between the hardened areas of said resist; the steps of immersing the plate in a chromium plating bath containing chromium trioxide and sulfate ions in a ratio of about 100 to 1, passing electric current between an anode and the plate as a cathode, at a selected current density between about ¾ ampere and 10 amperes per square inch for a period of about 1 to 3 minutes, interrupting the current for a period of about 15 to 60 seconds, and again passing the current between the anode and the plate for an additional period of 20 to 60 seconds, to deposit a layer of dull, fine-grained chromium on said surface, the temperature of the bath being maintained, at said selected current density per square inch, within the range defined by the following limits:

| | | | | | |
|---|---|---|---|---|---|
| 95° F. | to | 97.5° F. | at | 0.75 | ampere(s) |
| 95° F. | to | 102.0° F. | at | 1.0 | ampere(s) |
| 95° F. | to | 112.5° F. | at | 1.5 | ampere(s) |
| 95° F. | to | 122.0° F. | at | 2.0 | ampere(s) |
| 102° F. | to | 129.0° F. | at | 3.0 | ampere(s) |
| 109° F. | to | 130.0° F. | at | 4.0 | ampere(s) |
| 117° F. | to | 131.0° F. | at | 5.0 | ampere(s) |
| 118° F. | to | 132.0° F. | at | 6.0 | ampere(s) |
| 119° F. | to | 133.0° F. | at | 7.0 | ampere(s) |
| 120° F. | to | 133.5° F. | at | 8.0 | ampere(s) |
| 121° F. | to | 134.5° F. | at | 9.0 | ampere(s) |
| 122° F. | to | 135.5° F. | at | 10.0 | ampere(s) |

the steps for depositing the chromium on the plate being in any order with respect to the steps for forming the resist and etching the metal surface.

4. The method set forth in claim 3 in which the metal surface consists of a copper-base metal.

5. A method of making a planographic printing plate comprising immersing a plate having a smooth metal surface in a chromium plating bath containing chromium trioxide and sulfate ions in a ratio of about 100 to 1, passing electric current between an anode and the plate, as a cathode, at a selected current density between about ¾ ampere and 10 amperes per square inch for a period of about 1 to 3 minutes, interrupting the current for a period of about 15 to 60 seconds, again passing the current between the anode and the plate for an additional period of 20 to 60 seconds, to deposit a layer of dull, fine-grained chromium on said smooth surface, the temperature of the bath being maintained, at said selected current density per square inch, within the range defined by the following limits:

| | | | | | |
|---|---|---|---|---|---|
| 95° F. | to | 97.5° F. | at | 0.75 | ampere(s) |
| 95° F. | to | 102.0° F. | at | 1.0 | ampere(s) |
| 95° F. | to | 112.5° F. | at | 1.5 | ampere(s) |
| 95° F. | to | 122.0° F. | at | 2.0 | ampere(s) |
| 102° F. | to | 129.0° F. | at | 3.0 | ampere(s) |
| 109° F. | to | 130.0° F. | at | 4.0 | ampere(s) |
| 117° F. | to | 131.0° F. | at | 5.0 | ampere(s) |
| 118° F. | to | 132.0° F. | at | 6.0 | ampere(s) |
| 119° F. | to | 133.0° F. | at | 7.0 | ampere(s) |
| 120° F. | to | 133.5° F. | at | 8.0 | ampere(s) |
| 121° F. | to | 134.5° F. | at | 9.0 | ampere(s) |
| 122° F. | to | 135.5° F. | at | 10.0 | ampere(s) |

applying a resist-forming material to said chromium layer, exposing said material to light rays from subject matter to be reproduced, developing said resist-forming material to produce a resist representing said image having hardened areas and unhardened areas and applying an etching agent to said resist to penetrate through said unhardened areas and etch through said chromium layer to expose the underlying metal surface.

6. An article produced in accordance with the method set forth in claim 1.

7. A planographic printing plate made in accordance with the method set forth in claim 4.

8. A planographic printing plate made in accordance with the method set forth in claim 5.

9. A process of preparing a planographic printing plate which comprises applying a resist image to the surface of a metal plate having a smooth, ungrained surface of copper-base metal, exposing said resist to light through an image-bearing transparency, developing the resist to harden the exposed portions thereof and remove the unhardened portions of the resist from said surface, baking said resist image upon said surface, chemically cleaning the exposed metallic surface of said plate, immersing said surface of said plate in a plating bath consisting essentially of an aqueous solution of chromium trioxide and sulfate in proportions supplied by dissolving about 34 ounces of chromium trioxide and about .34 ounce of sulfuric acid in a gallon of water, passing an electric current between an anode and the plate as a cathode at a current density of about 1.5 amperes per square inch and at a potential of from about 4.5 to about 6.5 volts for from about 1.5 to about 3 minutes, interrupting the current for about 15 seconds, resuming the plating operation for about one additional minute while maintaining the temperature of the plating bath at between about 105° and 108° F. to deposit a layer of dull, fine grained chromium upon the exposed metallic surface of said plate, and removing said resist image to expose the smooth surface thereunder.

10. A process of preparing a planographic printing plate which comprises applying a resist to the surface of a smooth, copper-base metal plate, exposing said resist to light through a negative image to selectively harden the exposed portions of said resist, removing the nonhardened portions of the resist from said plate, baking the remaining hardened portions of the resist upon said plate to fix said resist to said plate, chemically cleaning the exposed metallic surface of said plate, immersing said plate in a plating bath consisting essentially of an aqueous solution of chromium trioxide and sulfate in the proportions supplied by dissolving about 34 ounces of chromium trioxide and about .34 ounce of sulfuric acid in a gallon of water, passing an electric current between an anode and the plate as a cathode at a current density of about 1.5 amperes per square inch and at a potential of from about 4.5 to about 6.5 volts for from about 1.5 to about 3 minutes, interrupting the current for about 15 seconds, and resuming the plating operation for about one additional minute while maintaining the temperature of the plating bath at between about 105° and 108° F. to deposit a coating of dull, fine grained chromium upon said exposed metallic surface, and removing said remaining resist to expose the smooth metallic surface thereunder.

11. A process of preparing a planographic printing plate having a bimetallic printing surface consisting essentially of smooth, ungrained copper portions receptive to ink and dull, fine-grained chromium portions receptive to water, which comprises applying a resist image to a smooth copper surface, baking said resist image upon said copper surface, chemically cleaning the exposed portion of said copper surface, immersing said copper surface in a plating bath consisting essentially of an aqueous solution of chromium trioxide and sulfate in the proportions supplied by dissolving about 34 ounces of chromium trioxide and about .34 ounce of sulfuric acid in a gallon of water, passing an electric current between an anode and the surface as a cathode at a current density of about 1.5 amperes per square inch and at a potential of from about 4.5 to about 6.5 volts for from about 1.5 to about 3 minutes, interrupting the current for about 15 seconds, and resuming the plating operation for about one additional minute while maintaining the temperature of the plating bath at between about 105° and 108° F. to deposit a water receptive coating of dull, fine-grained chromium upon the exposed copper surface, and removing said resist image to expose the smooth ink receptive copper surface thereunder.

References Cited in the file of this patent

UNITED STATES PATENTS

| Number | Name | Date |
|---|---|---|
| 927,577 | Murray | July 13, 1909 |
| 1,151,459 | Hatt | Aug. 24, 1915 |
| 1,603,779 | Schwartz | June 12, 1928 |
| 1,680,097 | Eaton | Aug. 7, 1928 |
| 1,750,418 | McFarland | Mar. 11, 1930 |
| 1,811,734 | Trist | June 23, 1931 |
| 1,909,716 | Pinner | May 16, 1933 |
| 2,172,344 | Brown et al. | Sept. 12, 1939 |
| 2,214,950 | Aller | Sept. 17, 1940 |

FOREIGN PATENTS

| Number | Country | Date |
|---|---|---|
| 475,902 | Great Britain | Nov. 29, 1937 |

OTHER REFERENCES

Proceedings Royal Society, London, vol. A181, 1943, pages 331–338.